Patented July 19, 1927.

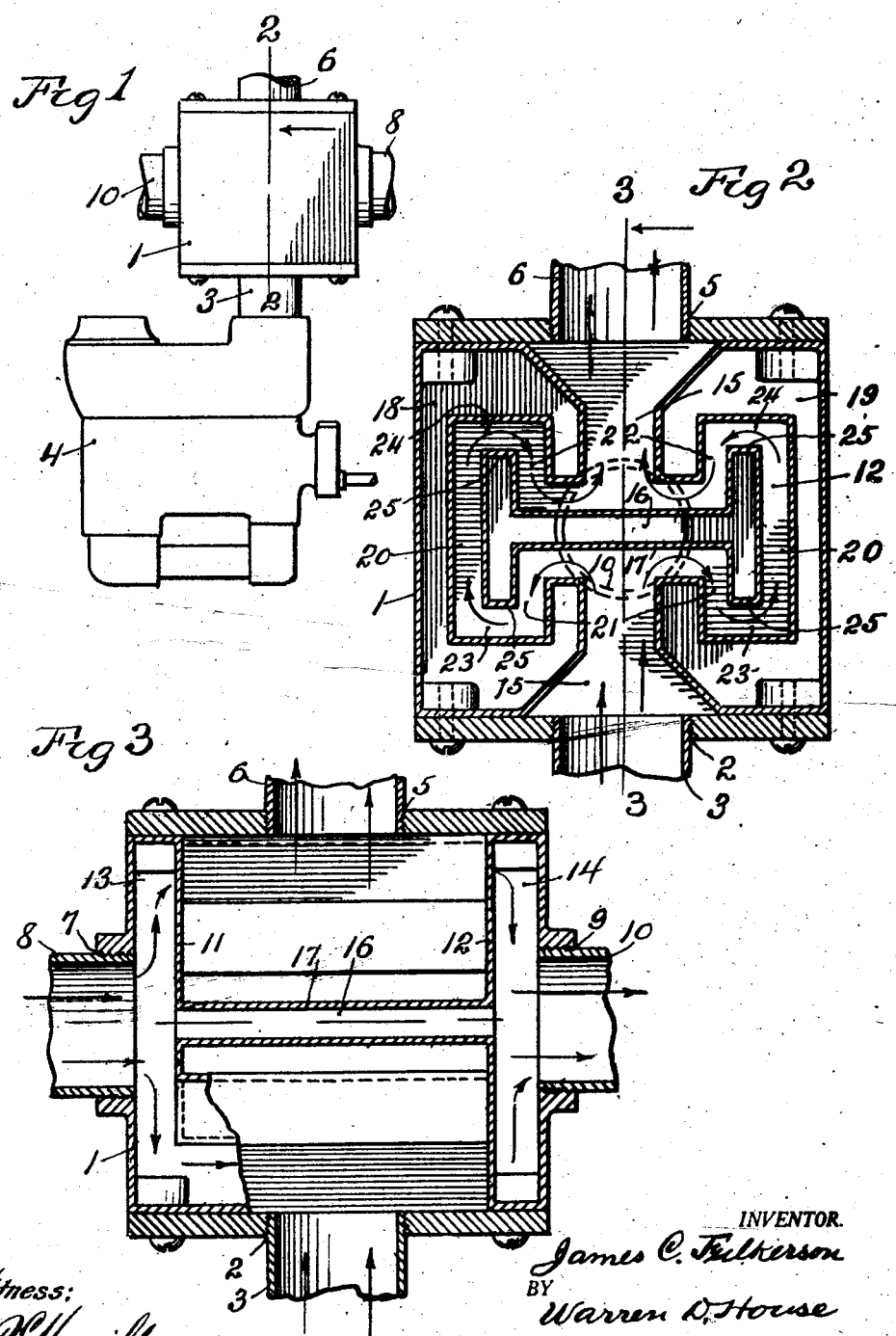

1,636,470

UNITED STATES PATENT OFFICE.

JAMES C. FULKERSON, OF KANSAS CITY, MISSOURI.

VAPORIZER FOR EXPLOSIVE ENGINES.

Application filed February 14, 1927. Serial No. 167,985.

My invention relates to improvements in vaporizers for explosive engines. It is adapted to be connected to the carburetor and exhaust manifold of an explosive engine.

One of the objects of my invention is to provide a novel vaporizer of the kind described, which is simple, cheap, durable, not liable to get out of order, which may be readily applied to explosive engines now in use, and which has a maximum of efficiency in heating and vaporizing the mixture as the latter passes from the carburetor to the intake manifold.

The novel features of my invention are hereinafter fully described and claimed.

In the accompanying drawing, which illustrates the preferred embodiment of my invention, Fig. 1 is a side elevation of my improved vaporizer shown mounted on a carburetor.

Fig. 2 is an enlarged section on the line 2—2 of Fig. 1.

Fig. 3 is a section on the line 3—3 of Fig. 2.

Similar reference characters designate similar parts in the different views.

1 designates a casing for my improved vaporizer, which may be of any desired form, and which in the drawings is shown as rectangular.

The bottom of the casing 1 is provided with a mixture inlet 2 in which is fitted a pipe 3 which connects with the outlet of a carburetor 4, of any desired type.

The top of the casing 1 is provided with a mixture outlet 5, which is connected by a pipe 6 with the intake manifold, not shown, of the engine, with which the vaporizer is used.

The casing 1 at one end is provided with an exhaust inlet 7 in which is fitted an exhaust pipe 8, which leads from the exhaust manifold, not shown.

The other end of the casing 1 is provided with an exhaust outlet 9 in which is fitted an exhaust discharge pipe 10.

Two irregular partitions 11 and 12 extend from the bottom to the top of the casing 1, respectively adjacent to and spaced from the ends of the casing, thereby providing in opposite ends of the casing two chambers 13 and 14, Fig. 3.

A mixture passage 15 extends through the casing 1 and has its ends respectively communicating with the inlet 2 and the outlet 5.

Extending transversely through the mixture passage 15 is a central exhaust passage 16, preferably of H-form and having its ends respectively communicating with the chambers 13 and 14. The walls of the exhaust passage 16, designated by 17, form the inner walls of the mixture passage 15.

Two outer exhaust passages 18 and 19, Fig. 2, have their ends respectively communicating with the chambers 13 and 14.

The mixture passage 15 is provided with two branches 20, Fig. 2, each of which has two return bends 21 and 22, thereby forming in each branch a lower recess 23 and an upper recess 24.

The exhaust passage 16 is provided with four lateral extensions 25 which extend respectively into the recesses 23 and 24.

The inner walls of the passages 18 and 19 form respectively the outer walls of the branch passages 20.

In the operation of the vaporizer the explosive mixture from the carburetor 4 passes through the pipe 3 into the inlet end of the mixture passage 15. The mixture divides and passing through the branches 20 unites above the exhaust passage 16 and then passes through the pipe 6 to the intake manifold.

The hot exhaust entering the casing 1 through the pipe 8 passes through the chamber 13 and thence through the exhaust passages 16, 18 and 19 and chamber 14 into the discharge pipe 10. The exhaust highly heats the inner and outer walls of the mixture passage 15 and its branches 20, whereby the mixture is efficiently vaporized.

By having the exhaust passage 16 disposed transversely within the mixture passage 15, the mixture, after entering the passage 15 strikes against the lower heated wall of the passage 16 and is then divided and deflected downwardly into the recesses 23, in which non-vaporized particles are dropped, and falling upon the bottom of said recesses 23 are vaporized and pass upwardly through the branches 20 into the upper recesses 24, where the mixture strikes the upper walls of the recesses 24, and is directed downwardly through the return bends 22 against the upper side of the middle portion of the exhaust passage 6, and around and between the portions of the mixture passage walls which extend between the extensions 25. The mixture, now thoroughly vaporized, passes into the pipe 6 and is carried thereby into the intake manifold, not shown.

I do not limit my invention to the structure shown and described, as modifications, within the scope of the appended claims, may be made without departing from the spirit of my invention.

What I claim is:

1. In a vaporizer of the kind described, a casing having in opposite sides respectively an inlet and an outlet for mixture, and having a passage for mixture communicating with said inlet and said outlet, the casing having transversely through said mixture passage an exhaust passage, the walls of which form the inner walls of the mixture passage, the outer walls of the mixture passage forming two pairs of recesses disposed one pair above the other, the recesses of one pair facing oppositely to the faces of the other pair, the walls of said exhaust passage having lateral extensions which extend respectively into said recesses, the outer walls of said mixture passage, being extended between said lateral extensions.

2. In a vaporizer of the kind described, a casing having a passage therethrough for mixture, an exhaust passage extending transversely through the mixture passage, the walls of the exhaust passage forming the inner walls of said mixture passage, said mixture passage having two branches each of which has in it a return bend, and two outer exhaust passages, the inner walls of which respectively form the outer walls of said branches.

3. In a vaporizer of the kind described, a casing having a passage therethrough for mixture, an exhaust passage extending transversely through the mixture passage, the walls of the exhaust passage forming the inner walls of said mixture passage, the mixture passage having two branches each having in it two return bends at opposite sides respectively of said exhaust passage, and two outer exhaust passages, the inner walls of which respectively form the outer walls of said branches.

In testimony whereof I have signed my name to this specification.

JAMES C. FULKERSON.